(12) United States Patent  
Cha (10) Patent No.: US 8,125,570 B2  
(45) Date of Patent: Feb. 28, 2012

(54) VIDEO PROCESSING APPARATUS AND VIDEO PROCESSING METHOD

(75) Inventor: Tae-hwan Cha, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 979 days.

(21) Appl. No.: 11/765,471

(22) Filed: Jun. 20, 2007

(65) Prior Publication Data

US 2008/0043153 A1 Feb. 21, 2008

(30) Foreign Application Priority Data

Aug. 16, 2006 (KR) ........................ 10-2006-0077209

(51) Int. Cl.  
*H04N 5/57* (2006.01)

(52) U.S. Cl. ......................... 348/687; 348/672; 348/673

(58) Field of Classification Search .......... 348/671–689; 345/77; 382/274  
See application file for complete search history.

(56) References Cited

U.S. PATENT DOCUMENTS 2,760,008 A 8/1956 Schade (Continued)

FOREIGN PATENT DOCUMENTS

EP 0470579 A2 2/1992

(Continued)

OTHER PUBLICATIONS

Office Action issued Feb. 24, 2011 by the Korean Intellectual Property Office, in counterpart Korean Patent Application No. Oct. 2006-0077209.

(Continued)

*Primary Examiner* — Michael Lee  
(74) *Attorney, Agent, or Firm* — Sughrue Mion, PLLC (57) ABSTRACT

Disclosed is a video processing apparatus including: a brightness adjusting part which adjusts the brightness of a whole portion of a received video signal according to a brightness adjusting value; and a brightness stretching part which calculates gradient values to stretch a first brightness in a first portion including a smaller brightness value than a first reference value and a second brightness in a second portion including a larger brightness value than a second reference value in the received video signal, and outputs the received video signal having the brightness adjusted by the brightness adjusting part in a third portion including a smaller brightness value than a minimum brightness value and in a fourth portion including a larger brightness value than a maximum brightness value in the received video signal by applying the calculated gradient values to the third portion and the fourth portion, respectively, to display the brightness of the received video signal corresponding to the third portion and the fourth portion.

17 Claims, 9 Drawing Sheets

U.S. PATENT DOCUMENTS

| | | | |
|---|---|---|---|
| 4,489,349 A | 12/1984 | Okada | |
| 5,191,420 A | 3/1993 | Lagoni et al. | |
| 6,373,533 B1 * | 4/2002 | Kawabata et al. | 348/672 |
| 6,600,519 B1 * | 7/2003 | Hwang | 348/673 |
| 7,199,840 B2 * | 4/2007 | Shiota | 348/678 |
| 7,292,734 B2 | 11/2007 | Lee et al. | |
| 2005/0031201 A1 * | 2/2005 | Goh | 382/169 |
| 2006/0023002 A1 | 2/2006 | Hara et al. | |
| 2006/0127081 A1 | 6/2006 | Lee et al. | |

FOREIGN PATENT DOCUMENTS

| | | |
|---|---|---|
| JP | 2004-78074 A | 3/2004 |
| KR | 1020050017813 A | 2/2005 |
| KR | 1020060008696 A | 1/2006 |
| KR | 10-2006-0044787 A | 5/2006 |

OTHER PUBLICATIONS

Communication dated Oct. 17, 2011 issued by the European Patent Office in counterpart European Patent Application No. 07113548.7.

Communication dated Sep. 7, 2011 issued by the Korean Intellectual Property Office in counterpart Korean Patent Application No. Oct. 2006-0077209.

* cited by examiner

VIDEO PROCESSING APPARATUS AND VIDEO PROCESSING METHOD

CROSS-REFERENCE TO RELATED APPLICATIONS

This application claims the benefit of Korean Patent Application No. 2006-0077209 filed on Aug. 16, 2006, in the Korean Intellectual Property Office, the disclosure of which is incorporated herein by reference.

BACKGROUND OF THE INVENTION

1. Field of the Invention

Apparatuses and methods consistent with the present invention relate to video processing, and more particularly, to video processing which adjusts a brightness of a received video signal and displays a corresponding video.

2. Description of the Related Art

Generally, a video processing apparatus performs a predetermined process for a received video signal, and displays a video corresponding to the processed video signal. The processing apparatus may clearly display a video by adjusting the brightness of a concerned video signal. In particular, the video processing apparatus may display a dark area to be darker and a bright area to be brighter on the video so as to clearly display the video.

That is, the video processing apparatus may adjust the brightness of a concerned video according to a user input or a predetermined algorithm. Here, the predetermined algorithm may stretch a brightness of a specific portion of the video signal. For example, the predetermined algorithm may stretch a dark portion and a bright portion to adjust the brightness of the video signal. At this time, the predetermined algorithm may include a Black and White Stretch (BWS) algorithm.

Generally, if the video processing apparatus may adjust the brightness of a video signal and display a corresponding video, the brightness of the video signal includes its predetermined range capable of being processed and displayed by the video processing apparatus. The BWS algorithm indicates that if a brightness range of the input video signal is within its available range that the video processing apparatus can process and display, the video processing apparatus can clearly display a video corresponding to the input video signal through the BWS algorithm by stretching the brightness range to the available range.

Hereinafter, the BWS algorithm will be described with reference to FIGS. 1, 2A and 2B.

Figure 1:
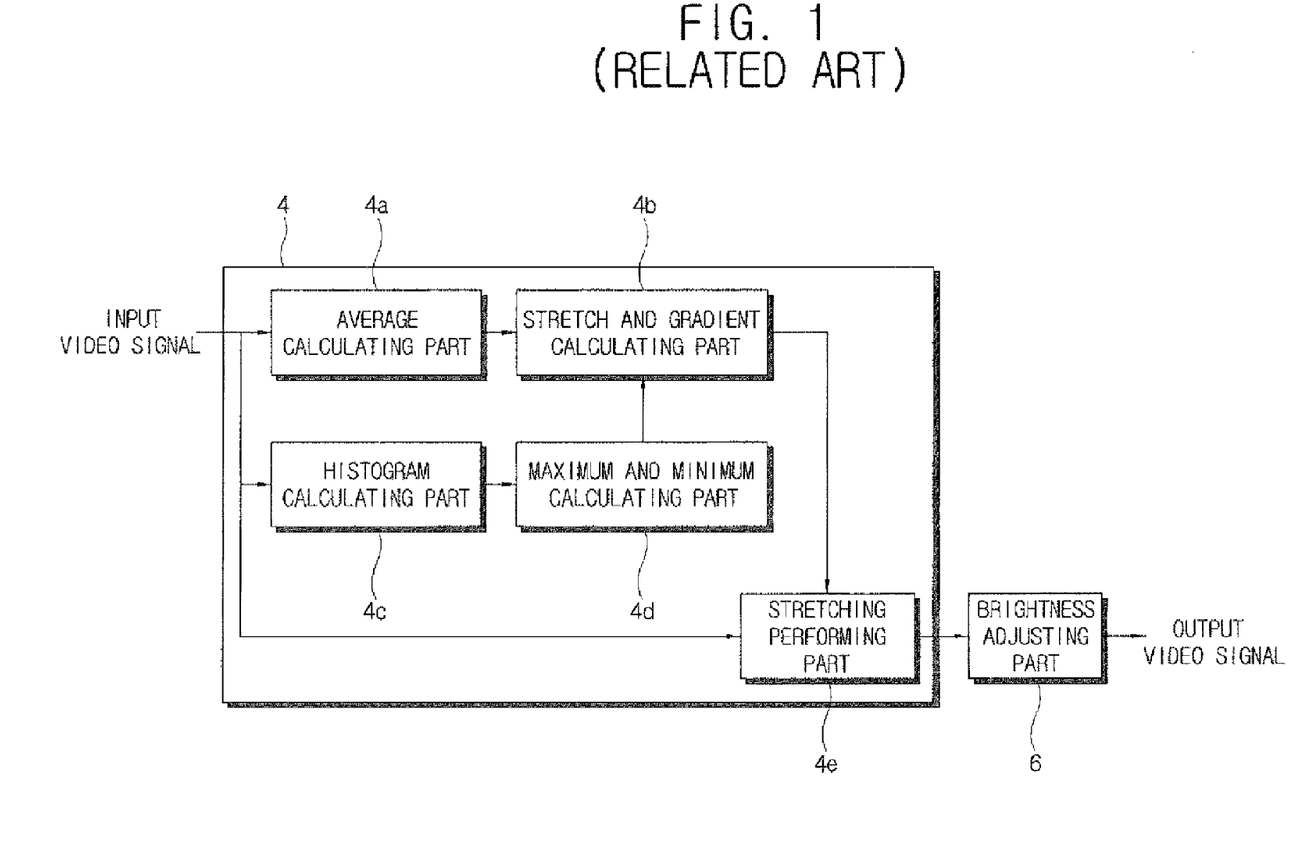
FIG. 1 is a view illustrating a configuration of a conventional video processing apparatus.

FIG. 1 is a block view illustrating a configuration of a conventional video processing apparatus to perform a BWS algorithm. As illustrated, a brightness stretching part 4 of the conventional video processing apparatus includes an average calculating part 4a, a stretch and gradient calculating part 4b, a histogram calculating part 4c, a maximum and minimum calculating part 4d, and a stretching performing part 4e.

The average calculating part 4a calculates an average brightness value of a received video signal. If the average brightness value is calculated, the stretch and gradient calculating part 4b calculates a stretching point and a gradient to perform a stretching operation based on the calculated brightness average value. Here, the gradient indicates a rate of brightness change of an output video signal with respect to brightness change of an input video signal, and the stretching point indicates an arbitrary coordinate value on a line with a concerned gradient of a brightness coordinate plane of the input video signal and the output video signal to stretch a predetermined range between the stretching point and a brightness maximum or minimum value of the input video signal.

Separately from the calculating operation of the stretching point and the gradient, the histogram calculating part 4c calculates a brightness histogram for the received video signal. Then, the maximum and minimum calculating part 4d calculates a brightness maximum value and a brightness minimum value of the received video signal from the histogram calculated by the histogram calculating part 4c.

Figure 2A:
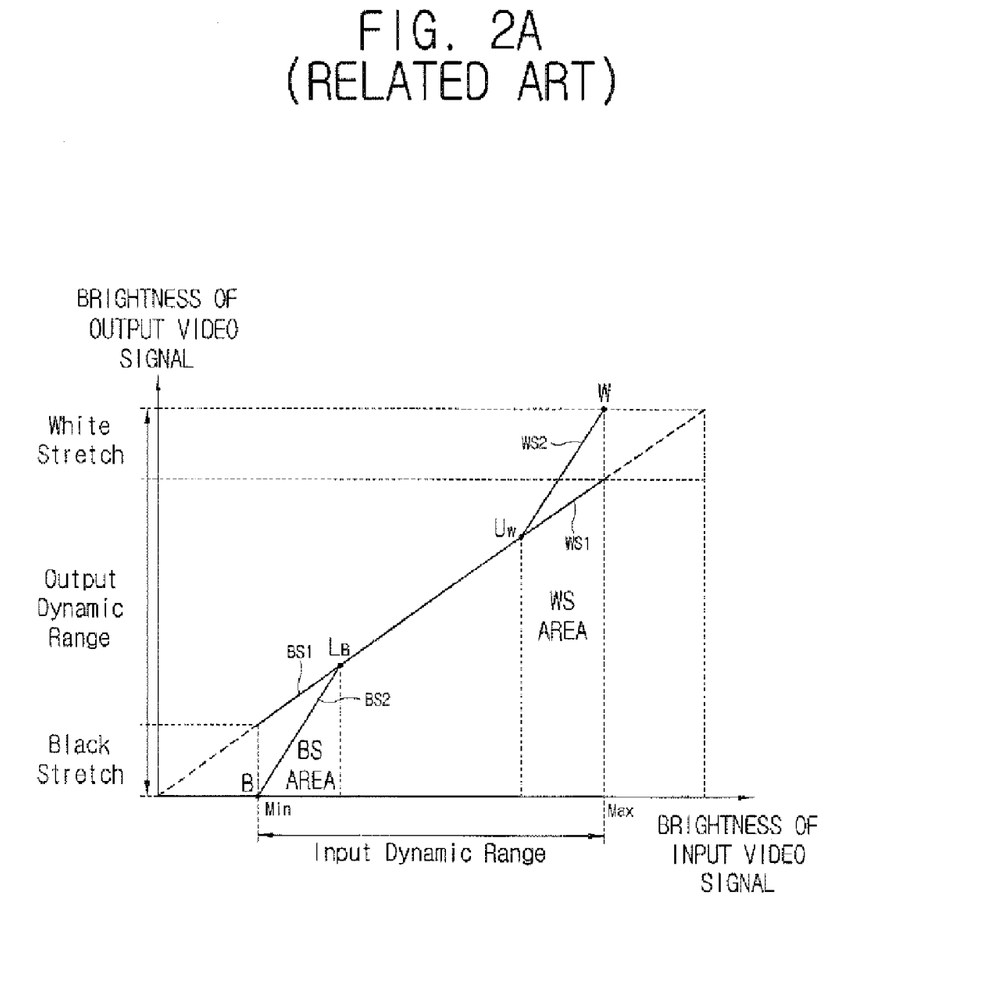
FIGS. 2A and 2B are graphic views illustrating an algorithm to stretch a brightness of a video signal in the conventional video processing apparatus.

In particular, as illustrated in FIG. 2A, the stretch and gradient calculating part 4b of the brightness stretching part 4 compares the average brightness value with respective brightness values of a preset black stretching point $L_B$ and a white stretching point $U_W$. As the result of comparing, if the brightness value of the preset black stretching point $L_B$ is larger than the average brightness value, the stretch and gradient calculating part 4b sets up the average brightness value as a new black stretching point $L_B$. Also, if the brightness value of the preset white stretching point $U_W$ is smaller than the average brightness value, the stretch and gradient calculating part 4b sets up the average brightness value as new white stretching point $U_W$. Accordingly, if the black and white stretching points $L_B$ and $U_W$ are determined through the above-described comparing operation, the brightness stretching part 4 sets up a "BS" area and a "WS" area. Here, the "BS" area indicates an area having smaller brightness value than the black stretching point $L_B$, and the "WS" area indicates another area having larger brightness value than the white stretching point $U_W$.

Then, the stretching performing part 4e changes a gradient from BS1 to BS2 in the "BS" area, and from WS1 to WS2 in the "WS" area, by changing the previous gradients BS1 and WS1. Accordingly, the video processing apparatus can display a dark portion to be darker and a bright portion to be brighter on the video by stretching corresponding ranges of the dark and bright portions of the received video signal in order to emphasize the corresponding brightness contrast.

Figure 2B:
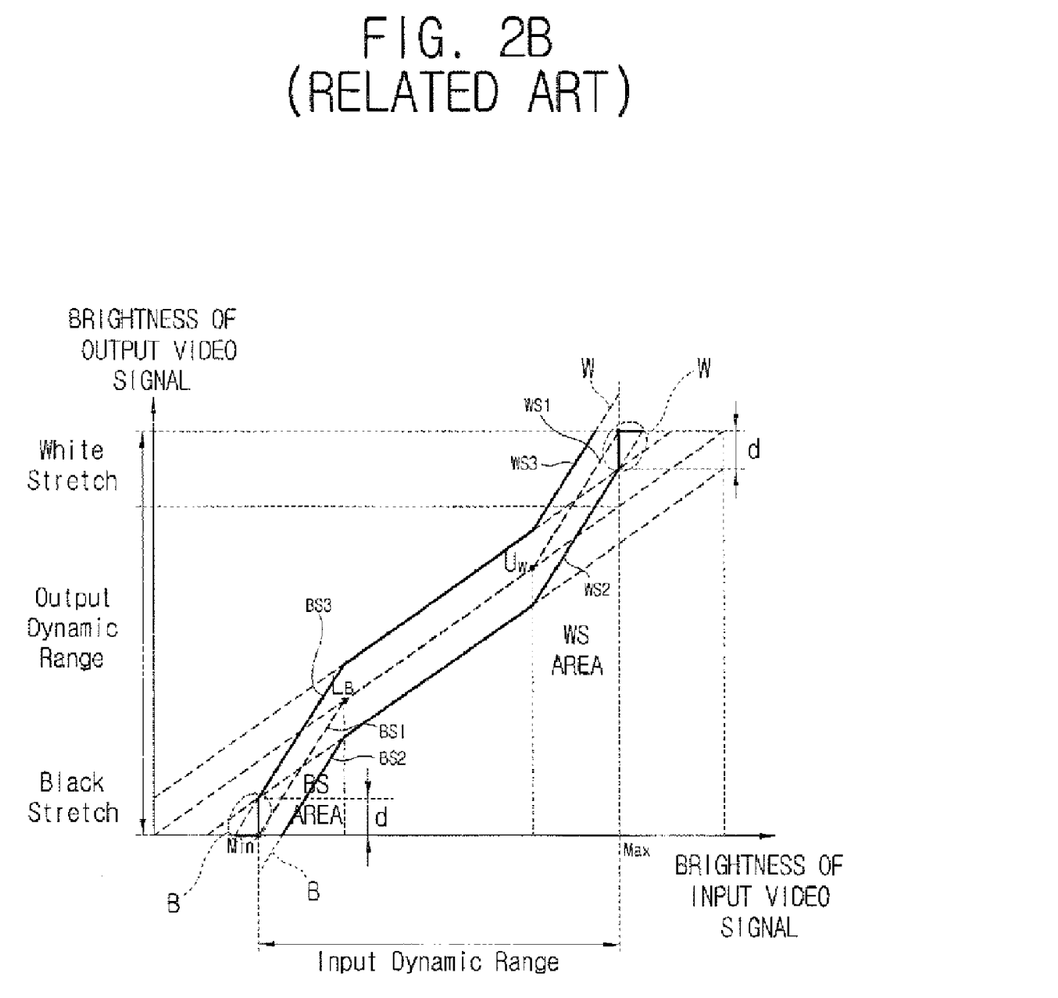

However, for example, if the BWS algorithm is performed by the brightness stretching part 4, and the brightness of the whole portion of the received video signal is adjusted, the stretching performing part 4e changes the gradient from BS1 to BS2 or BS3 in the "BS" area, and from WS1 to WS2 or WS3 in the "WS" area as illustrated in FIG. 2B.

At this time, since the conventional video processing apparatus adjusts the brightness of the whole portion of the received video signal, a brightness range of a specific portion (for example, a "B" portion and a "W" portion in FIG. 2B) of the received video signal is not suitably stretched by the BWS algorithm. Accordingly, the brightness of the received video signal corresponding to portions "B" or "W" cannot be suitably displayed.

SUMMARY OF THE INVENTION

The present invention provides a video processing apparatus and a video processing method, which can clearly display the brightness of a whole portion of an original video signal even if the brightness of the whole portion of the original video signal is adjusted, or a brightness range of a specific portion of the original video signal is stretched.

According to an aspect of the present invention, there is provided a video processing apparatus comprising: a brightness adjusting part which adjusts the brightness of a whole portion of a received video signal according to a preset brightness adjusting value; and a brightness stretching part which calculates gradient values to stretch a first brightness in a first portion including a smaller brightness value than a first reference value and a second brightness in a second portion including a larger brightness value than a second reference value in the received video signal, and outputs the received video signal having the brightness adjusted by the brightness adjusting part in a third portion including a smaller brightness value than a minimum brightness value and in a fourth portion including a larger brightness value than a maximum brightness value in the received video signal by applying the calculated gradient values to the third portion and the fourth portion, respectively, to display the brightness of the received video signal corresponding to the third portion and the fourth portion.

If the brightness adjusting part increases the brightness of the whole portion of the received video signal, the brightness stretching part calculates the gradient value to stretch the first brightness in the first portion including the smaller brightness value than the first reference value in the received video signal, and outputs the received video signal having the increased brightness in a third portion including a smaller brightness value than a minimum brightness value in the video signal by applying the calculated gradient value to the third portion, to display the brightness of the received video signal corresponding to the third portion.

If the brightness adjusting part decreases the brightness of the whole portion of the received video signal, the brightness stretching part calculates the gradient value to stretch the second brightness in the second portion including the larger brightness value than the second reference value in the received video signal, and outputs the received video signal having the decreased brightness in a fourth portion including a larger brightness value than a maximum brightness value in the video signal by applying the calculated gradient value to the fourth portion, to display the brightness of the received video signal corresponding to the fourth portion.

The video processing apparatus further comprises a user input part to receive a desired brightness value from a user, wherein the brightness adjusting part adjusts the brightness of the whole portion of the received video signal depending on the brightness value received from the user.

The video processing apparatus further comprises a storing part to store the brightness adjusting value and the gradient values, wherein the brightness adjusting part adjusts the brightness depending on the stored brightness adjusting value, and the brightness stretching part outputs the video signal having the adjusted brightness in a third portion including a smaller brightness value than a minimum brightness value and in a fourth portion including a larger brightness value than a maximum brightness value in the received video signal by applying the gradient value stored in the storing part to the third portion and the fourth portion, respectively, to display the brightness of the received video signal corresponding to the third portion and the fourth portion.

According to another aspect of the present invention, there is provided a video processing apparatus comprising: a video processing part which outputs and displays a received video signal; and a controller which checks whether gradient values calculated to stretch a first brightness in a first portion including a smaller brightness value than a first reference value and a second brightness in a second portion including a larger brightness value than a second reference value in the received video signal, and a brightness adjusting value to adjust the brightness of a whole portion of the received video signal are preset, and controls the video processing part to adjust the brightness of the received video signal depending on the preset brightness adjusting value if the gradient value and the brightness adjusting value are preset, and controls the video processing part to output the received video signal having the brightness adjusted by the brightness adjusting part in a third portion including a smaller brightness value than a minimum brightness value and in a fourth portion including a larger brightness value than a maximum brightness value in the received video signal by applying the calculated gradient values to the third portion and the fourth portion, respectively, to display the brightness of the received video signal corresponding to the third portion and the fourth portion.

If the brightness of the whole portion of the received video signal is increased by the preset brightness adjusting value, the controller calculates the gradient value to stretch the first brightness in the first portion including the smaller brightness value than the first reference value in the received video signal, and outputs the received video signal having the increased brightness in a third portion including a smaller brightness value than a minimum brightness value in the video signal by applying the calculated gradient value to the third portion, to display the brightness of the received video signal corresponding to third portion If the brightness of the whole portion of the received video signal is decreased by the preset brightness adjusting value, the controller calculates the gradient value to stretch the second brightness in the second portion including the larger brightness value than the second reference value in the received video signal, and outputs the received video signal having the decreased brightness in a fourth portion including a larger brightness value than a maximum brightness value in the video signal by applying the calculated gradient value to the fourth portion, to display the brightness of the received video signal corresponding to the fourth portion.

The video processing apparatus further comprises a user input part to receive a desired brightness value from a user, wherein the controller adjusts the brightness of the whole portion of the received video signal depending on the received brightness value from the user.

The video processing apparatus further comprises a storing part to store the brightness adjusting value and the gradient values, wherein the controller controls the video processing part to output the video signal having the adjusted brightness in a third portion including a smaller brightness value than a minimum brightness value and in a fourth portion including a larger brightness value than a maximum brightness value in the received video signal by applying the gradient value stored in the storing part to the third portion and the fourth portion, respectively, to display the brightness of the received video signal corresponding to the third portion and the fourth portion.

The video processing apparatus further comprises an OSD (On-Screen Display) processing part which processes OSD data corresponding to the brightness adjusting value, wherein the controller controls the OSD processing part and the video processing part to display a user input menu as an OSD to input the brightness adjusting value.

According to another aspect of the present invention, there is provided a video processing method comprising: receiving a video signal; calculating gradient values to stretch a first brightness in a first portion including a smaller brightness value than a first reference value and a second brightness in a second portion including a larger brightness value than a second reference value in the received video signal; adjusting the brightness of a whole portion of the received video signal depending on a preset brightness adjusting value; and outputting the received video signal having the adjusted brightness in a third portion including a smaller brightness value than a minimum brightness value and in a fourth portion including a larger brightness value than a maximum brightness value in the received video signal by applying the gradient values to the third portion and the fourth portion, respectively, to display the brightness of the received video signal corresponding to third portion and the fourth portion.

If the brightness of a whole portion of a received video signal is increased depending on a preset brightness adjusting value, the outputting the received video signal having the adjusted brightness comprising calculating the gradient value to stretch the first brightness in the first portion including the smaller brightness value than the first reference value in the received video signal, and outputting the received video signal having the increased brightness in a third portion including a smaller brightness value than a minimum brightness value in the video signal by applying the calculated gradient value to the third portion, to display the brightness of the received video signal corresponding to third portion.

If the brightness of a whole portion of a received video signal is decreased depending on a preset brightness adjusting value, the outputting the received video signal having the adjusted brightness comprising calculating the gradient value to stretch the second brightness in the second portion including the larger brightness value than the second reference value in the received video signal, and outputting the received video signal having the decreased brightness in a fourth portion including a larger brightness value than a maximum brightness value in the video signal by applying the calculated gradient value to the fourth portion, to display the brightness of the received video signal corresponding to the fourth portion.

The adjusting the brightness of a whole portion of the received video signal further comprises receiving a desired brightness value from a user, and adjusting the brightness of the whole portion of the received video signal depending on the received brightness value from the user.

BRIEF DESCRIPTION OF THE DRAWINGS

The above and/or other aspects of the present invention will become apparent and more readily appreciated from the following description of the exemplary embodiments, taken in conjunction with the accompanying drawings of which.

DETAILED DESCRIPTION OF EXEMPLARY EMBODIMENTS OF THE INVENTION

Reference will now be made in detail to the exemplary embodiments of the present invention, examples of which are illustrated in the accompanying drawings, wherein like reference numerals refer to like elements throughout.

Figure 3A:
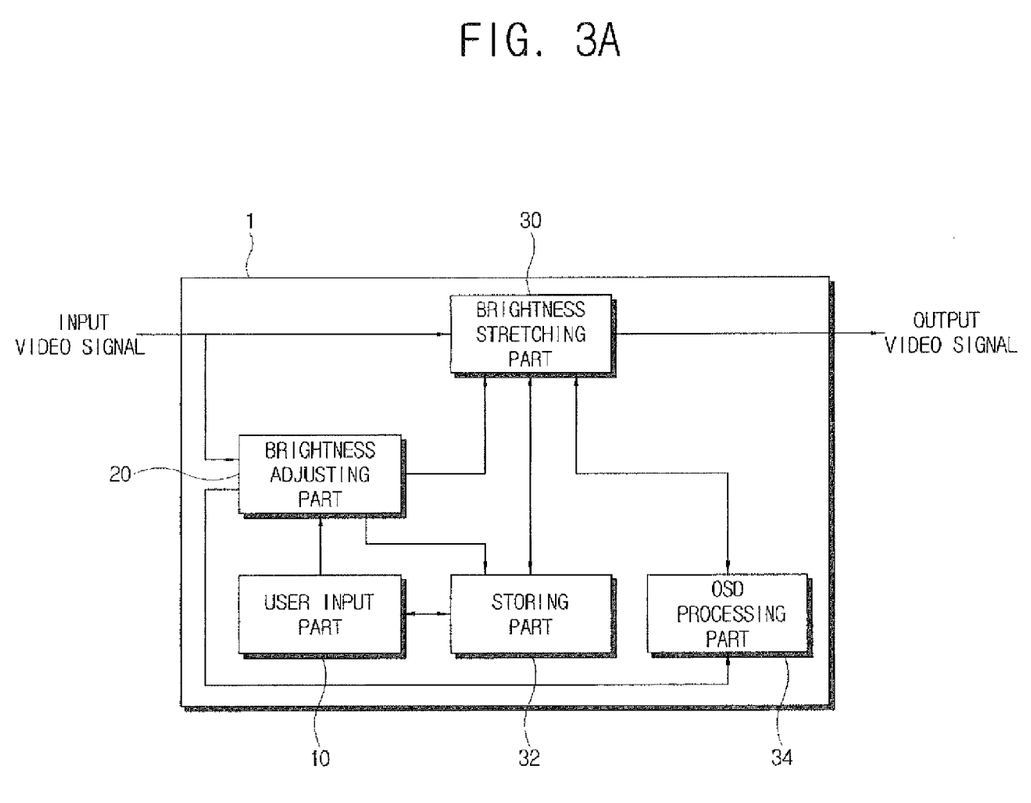
FIGS. 3A and 3B are block views illustrating a configuration of a video processing apparatus according to a first exemplary embodiment of the present invention.
Figure 3B:
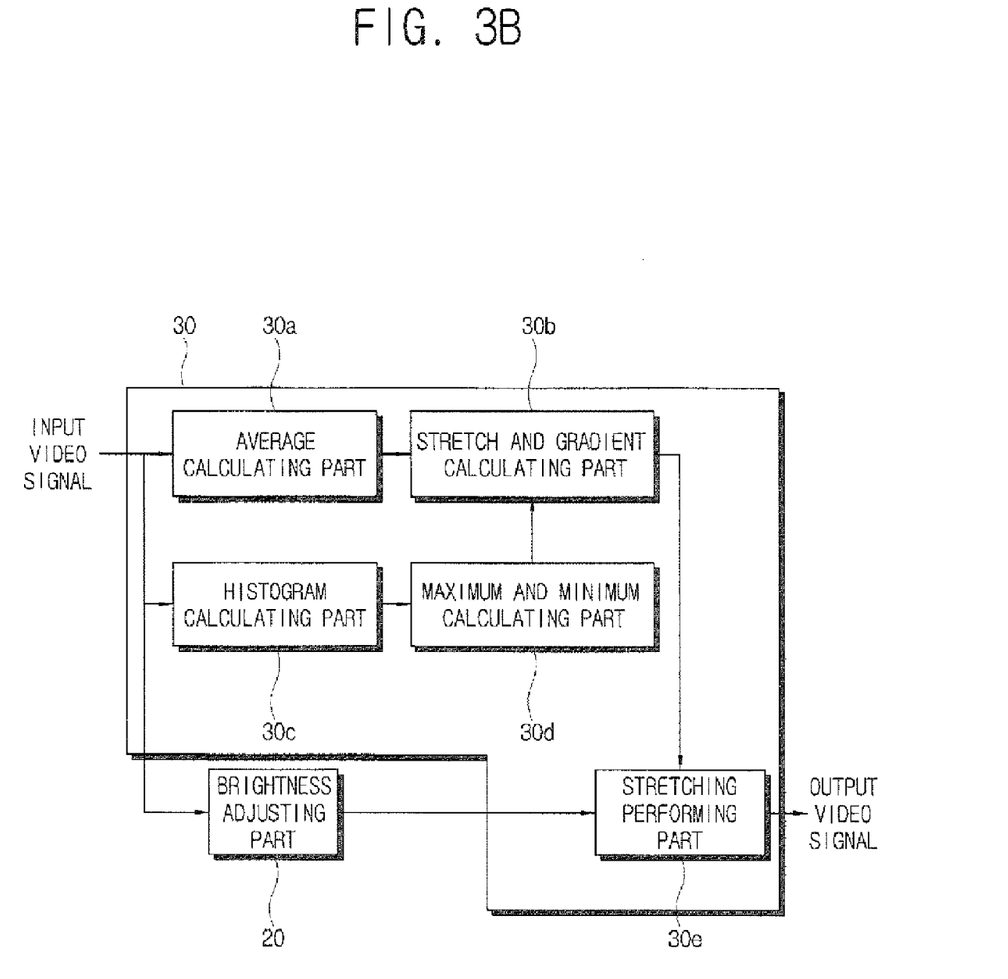

Hereinafter, a first exemplary embodiment of the present invention will be described with reference to FIGS. 3A and 3B. FIGS. 3A and 3B are block views illustrating a configuration of a video processing apparatus 1 according to the first exemplary embodiment of the present invention. As illustrated in FIG. 3A, the video processing apparatus 1 includes a brightness adjusting part 20 and a brightness stretching part 30. The video processing apparatus 1 may further include a user input part 10, a storing part 32, and an on screen display (OSD) processing part 34. In the present invention, it is for example described that the video processing part includes a TV system.

A user inputs a desired brightness value of a video through the user input part 10. In the case that the video processing part according to the present invention includes the TV system, the user input part 10 may include a predetermined key provided on the TV system and/or a corresponding remote controller.

The brightness adjusting part 20 adjusts the brightness of a whole portion of a received video signal according to a preset brightness value. Preferably, but not necessarily, the brightness adjusting part 20 adjusts the brightness of the whole portion of the received video signal according to the user brightness value that the user inputs through the user input part 10. For example, the brightness adjusting part 20 adjusts the brightness of the whole portion of the received video signal to be brighter or darker so that the user may accomplish the desired brightness value.

As illustrated in FIG. 3B, the brightness stretching part 30 includes an average calculating part 30a, a stretch and gradient calculating part 30b, a histogram calculating part 30c, a maximum and minimum calculating part 30d, and a stretching performing part 30e. The brightness stretching part 30 includes a same configuration as the brightness stretching part 4 of the conventional video processing apparatus. The brightness stretching part 30 calculates a gradient value through an average brightness value of the received video signal, a stretching point, a brightness histogram, maximum and minimum values of the concerned brightness.

On the other hand, as described in FIG. 3B, the brightness of the whole portion of the received video signal is adjusted separately from a performance of a BWS algorithm. Then, the received video signal having the wholly-adjusted brightness can be outputted even in a portion including a smaller brightness value than a minimum input brightness value and another portion including a larger brightness than a maximum input brightness value, respectively by applying the calculated gradient value to the received video signal and stretching a corresponding brightness therein.

Hereinafter, a BWS algorithm of the brightness stretching part 30 according to the present invention will be described in detailed with reference to FIGS. 4A and 4B.

Figure 4A:
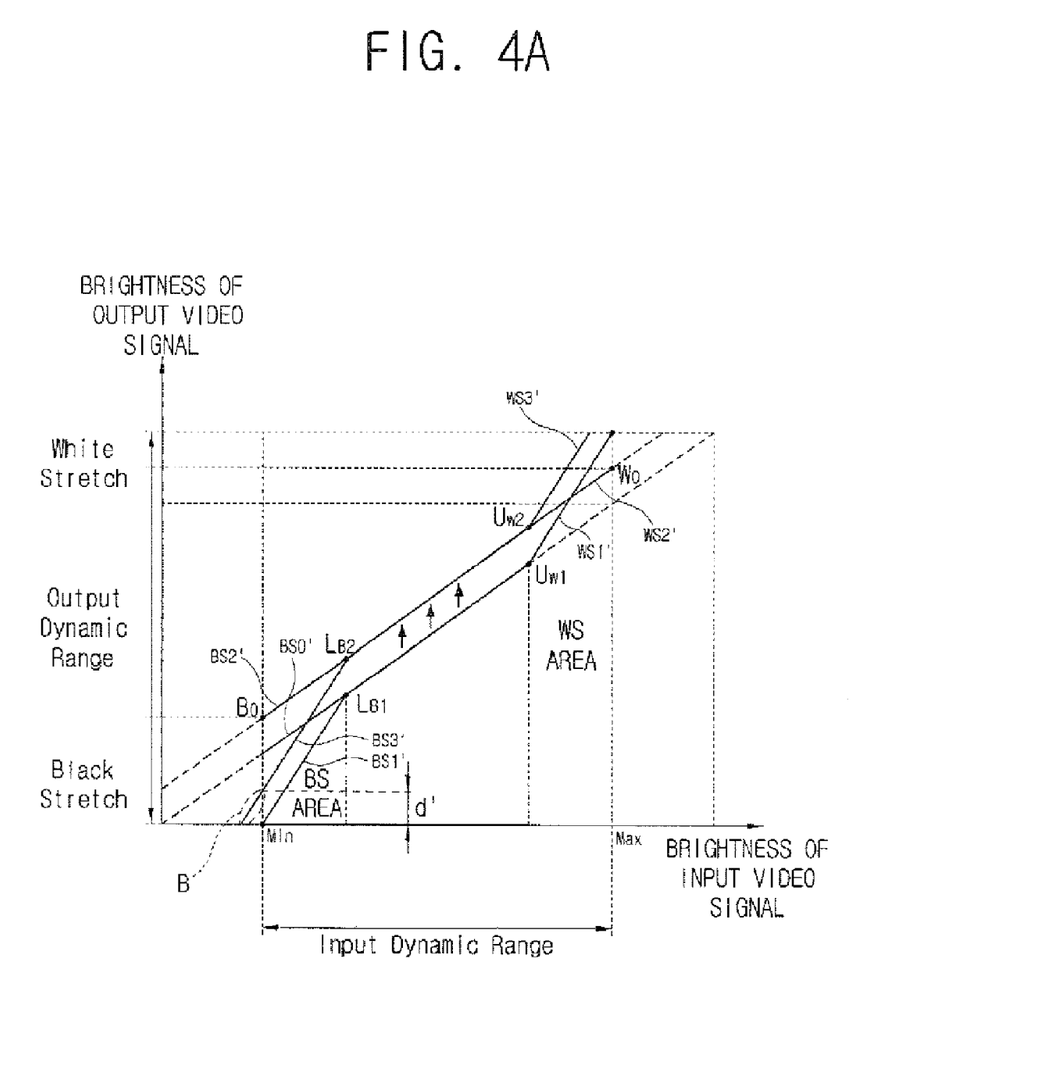
FIGS. 4A and 4B are graphs illustrating an algorithm to stretch a brightness of a video signal in a video processing apparatus according to the present invention.

FIG. 4A is a graph view illustrating an algorithm to stretch a brightness of a concerned portion of a video signal when a user wholly increases the brightness of the video signal. In particular, the brightness stretching part 30 performs the BWS algorithm to stretch a brightness of a concerned dark area to be darker on a screen by applying the calculated gradient value to the BS0' and change the gradient from BS0' to BS1' in a "BS'" area.

Then, if the user uniformly increases the brightness of a received video signal by a predetermined reference value d', the brightness stretching part 30 firstly changes the gradient from BS0' to BS2' by uniformly increasing BS0' by the reference value d'. Then, the brightness stretching part 30 changes the gradient from BS2' to BS3' through the BWS algorithm. Here, BS0' is the gradient of the video signal before performing the BWS algorithm.

At this time, a rate of changing the gradient from BS2' to BS3' is the same as the calculated rate of gradient to change the gradient from BS0' to BS1' in the "BS" area. Accordingly, the brightness of a corresponding video signal even in a "B" area can be clearly displayed by changing of the previous gradient to a gradient value corresponding to the "B" area, i.e., by outputting the corresponding video signal in the "B" area of the received video signal. Here, the "B" area indicates an area where an input signal cannot be suitably displayed by a conventional way, and the changed gradient is calculated through the average brightness value, the stretching point, the brightness histogram, the maximum and minimum values of the brightness to perform the BWS algorithm for the received video signal having wholly increased brightness. Thus, the brightness stretching part 30 can perform the BWS algorithm capable of clearly displaying the received video signal even in the "B" area although the user increases the brightness of the whole portion of the received video signal.

Figure 4B:
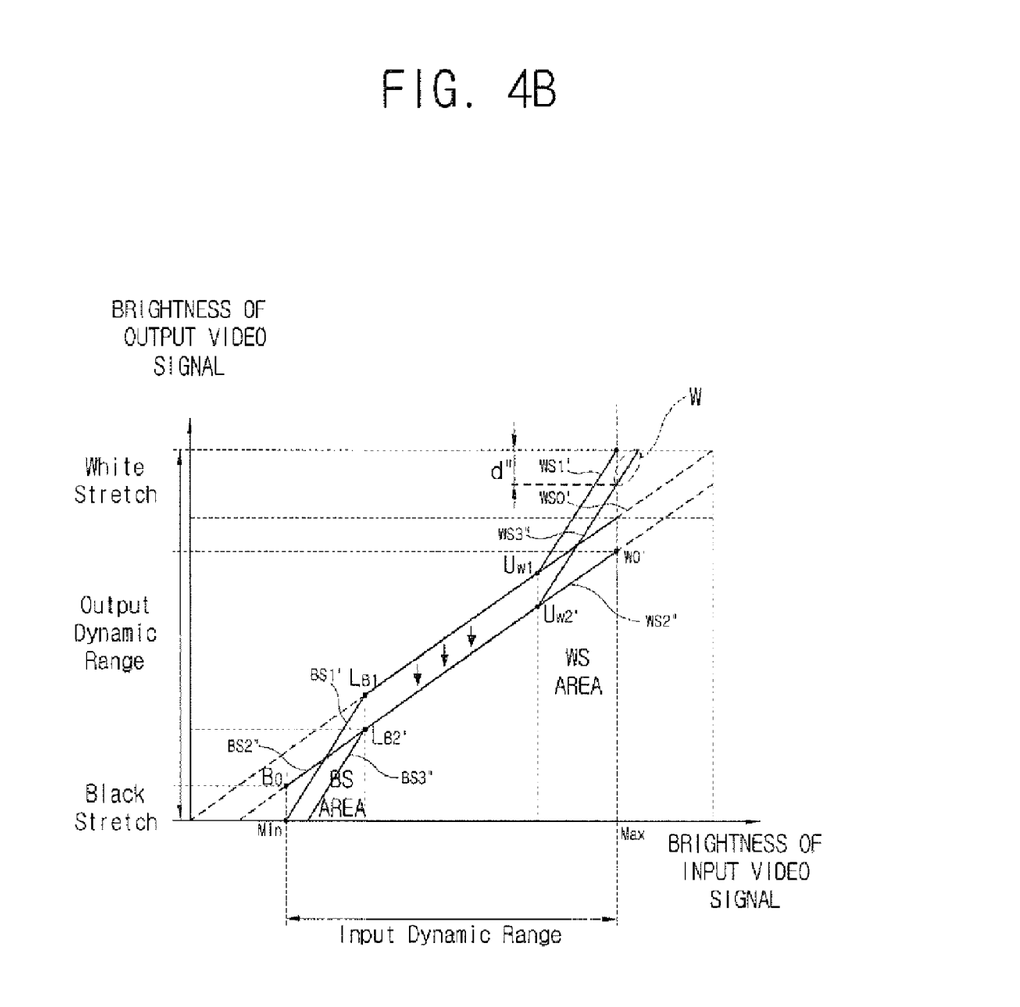

FIG. 4B is a graph illustrating an algorithm to stretch a brightness of a concerned portion of a video signal if the user decreases the brightness of the video signal. For example, the brightness stretching part 30 performs the BWS algorithm to stretch a brightness of a concerned bright area to be brighter on a screen by changing the gradient from WS0' to WS1' in a "WS" area.

Then, if the user decreases the brightness of the whole portion of a received video signal by a predetermined reference value d", the brightness stretching part 30 firstly changes the gradient value from WS0' to WS2" by uniformly decreasing WS0' by the reference value d". Then, the brightness stretching part 30 changes the gradient value from WS2" to WS3" through the BWS algorithm. Here, WS0' is the gradient value of the video signal before performing the BWS algorithm.

At this time, like the "BS" area in FIG. 4A, a rate of changing the gradient from WS2" to WS3" is the same as the calculated rate of the gradient from WS0' to WS1' in the "WS" area. Accordingly, the brightness of a corresponding video signal even in a "W" area can be clearly displayed by changing the previous gradient to a gradient corresponding to the "W" area, i.e. by outputting the corresponding video signal in the "W" area of the received video signal. Here, the "W" area indicates an area where a corresponding signal cannot be suitably displayed by a conventional way, and the changed gradient is calculated through the average brightness value, the stretching point, the brightness histogram, the maximum and minimum values of the brightness to perform the BWS algorithm for the received video signal having wholly decreased brightness. Thus, the brightness stretching part 30 can perform the BWS algorithm capable of clearly displaying the received video signal even in the "W" area although the user decreases the brightness of the whole portion of the received video signal.

Figure 5:
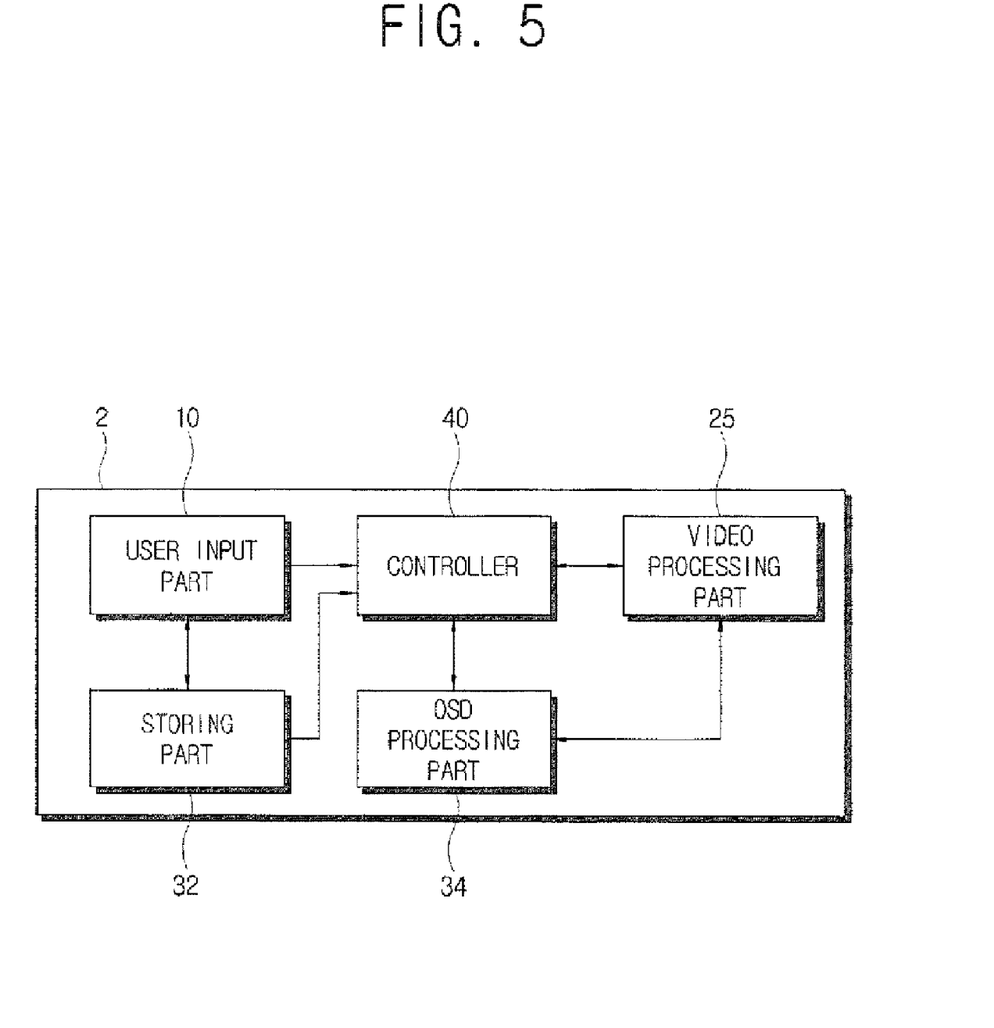
FIG. 5 is a block view illustrating a configuration of a video processing apparatus according to a second exemplary embodiment of the present invention.

FIG. 5 is a block view illustrating a configuration of a video processing apparatus 2 according to a second exemplary embodiment of the present invention. As illustrated, the video processing apparatus 2 includes a video processing part 25 and a controller 40. Similar to the video processing apparatus 1 according to the first exemplary embodiment, the video processing apparatus 2 may further include a storing part 32 and an OSD processing part 34, and a user input part 10.

The video processing part 25 processes and outputs a received video signal. The video processing part 25 performs a decoding process to detect video information from the received video signal, a scaling process to adjust the resolution of the decoded video signal depending on properties of a display part (not shown) of the video processing apparatus 2 and a user input, a picture enhancement process to improve the quality of the video signal, and the like.

The controller 40 checks whether a gradient, calculated to stretch a first brightness in a first portion including a smaller brightness value than a first reference value and a second brightness in a second portion including a larger brightness value than a second reference value, and a brightness adjusting value to uniformly adjust a brightness value of a whole portion, in the received video signal are preset. Here, the brightness adjusting value may be input through the user input part 10, or may be preset in the storing part 32. Like the brightness adjusting value, the gradient may be further preset in the storing part 32.

As a result, if both the brightness adjusting value and the gradient are preset, the controller 40 controls the video processing part 25 to adjust the brightness of the received video signal depending on the brightness adjusting value, and to clearly output a first video signal having the adjusted brightness from an area in the first portion having a smaller brightness value than the first reference value (that is, black stretching point) to another area in a third portion including a smaller brightness value than a minimum brightness value and to clearly output a second video signal including the adjusted brightness from an area in the second portion having a larger brightness value than the second reference value (that is, white stretching point) to another area in a fourth portion having a larger brightness value than a maximum brightness value.

Herein, the controller 40 may include a micro controller, and a software program may control an operation of the controller 40.

Figure 6:
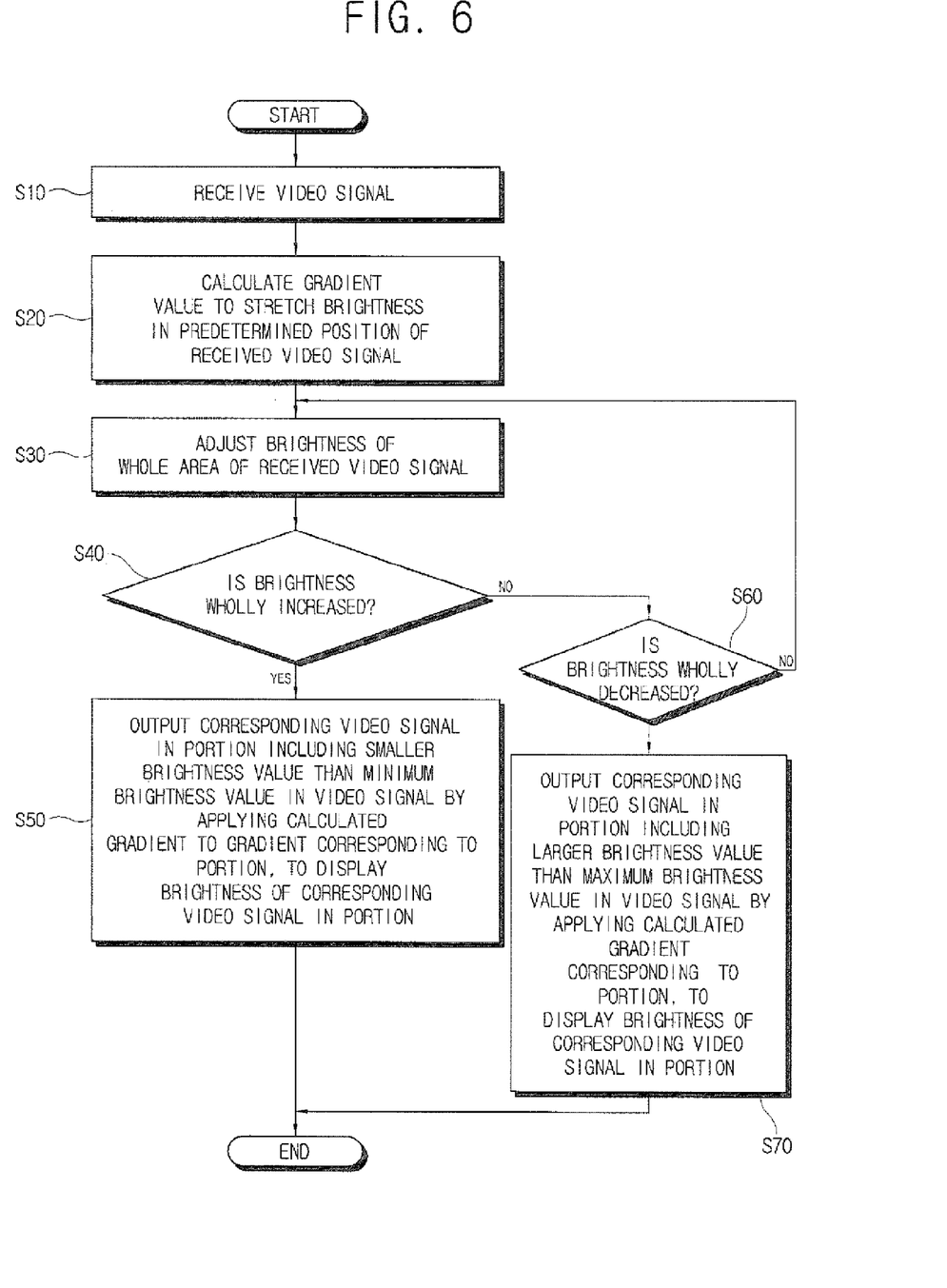
FIG. 6 is a flow chart illustrating an operation of the video processing apparatus according to the present invention.

Hereinafter, a control method of the video processing apparatus 1 according to the present invention will be described with reference to FIG. 6.

First, the controller 40 receives a video signal (S10). Then, the controller 40 calculates a gradient to stretch a first brightness in a first portion including a smaller brightness value than a first reference value, and a second brightness range in a second portion including a larger brightness value than a second reference value in the video signal received in operation S10 (S20).

Then, the controller 40 controls the video processing part 25 to adjust the brightness of a whole portion of the received video signal depending on a preset brightness adjusting value (S30). Here, the controller 40 calculates the gradient of the received video signal before the brightness is wholly adjusted. Accordingly, operation S20 may be performed after operation S30.

If the brightness is wholly adjusted in operation S30, the controller 40 checks whether the brightness is uniformly increased (S40). If the brightness is uniformly increased, the controller 40 controls the video processing part 25 to output a corresponding video signal in a portion including a smaller brightness value than a minimum brightness value in the video signal received in operation S10 by changing the gradient value calculated in operation S20 to a gradient corresponding to the portion (S50), thereby clearly displaying the brightness of the corresponding video signal even in the portion.

If the brightness is not uniformly increased in operation S40, the controller 40 checks whether the brightness is uniformly decreased (S60). If the brightness is uniformly decreased, the controller 40 controls the video processing part 25 to output a corresponding video signal in a portion including a larger brightness value than a maximum brightness value in the video signal received in operation S10 by changing the gradient value calculated in operation S20 to a gradient corresponding to the portion (S70), thereby clearly displaying the brightness of the corresponding video signal even in the portion.

Accordingly, the brightness of an original video signal can be clearly displayed even if the brightness of a whole portion of the original video signal is adjusted, or the brightness of a specific area of the original video signal is adjusted. For example, if the brightness of the original video signal is wholly brighten, a dark area on a concerned video can be clearly displayed, and if the brightness of the original video signal is wholly darken, a bright area on the concerned video can be clearly displayed.

As apparent from the above description, a video processing apparatus according to the exemplary embodiments of the present invention can improve video quality by clearly displaying the brightness of an original video signal even if the brightness of a whole portion of the original video signal is adjusted, or the brightness of a specific area of the original video signal is adjusted.

Further, a video processing apparatus according to the exemplary embodiments of the present invention can clearly display a dark area on a concerned video if the brightness of the original video signal is wholly brighten, and clearly display a bright area on the concerned video if the brightness of the original video signal is wholly darken, to improve video quality.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A video processing apparatus comprising:
a brightness adjusting part which adjusts a brightness of a whole portion of a received video signal according to a brightness adjusting value; and
a brightness stretching part which calculates gradient values to stretch a first brightness in a first portion including a brightness value that is smaller than a first reference value and a second brightness in a second portion including a brightness value that is larger than a second reference value in the received video signal, and outputs the received video signal having the brightness adjusted by the brightness adjusting part in a third portion including a brightness value that is smaller than a minimum brightness value and in a fourth portion including a brightness value that is larger than a maximum brightness value in the received video signal by applying the calculated gradient values to the third portion and the fourth portion, respectively, to display the brightness of the received video signal corresponding to the third portion and the fourth portion.

2. The video processing apparatus according to claim 1, wherein if the brightness adjusting part increases the brightness of the whole portion of the received video signal, the brightness stretching part calculates the gradient value to stretch the first brightness in the first portion including the brightness value that is smaller than the first reference value in the received video signal, and outputs the received video signal having the increased brightness in the third portion including the brightness value that is smaller than the minimum brightness value in the video signal by applying the calculated gradient value to the third portion, to display the brightness of the received video signal corresponding to the third portion.

3. The video processing apparatus according to claim 1, wherein if the brightness adjusting part decreases the brightness of the whole portion of the received video signal, the brightness stretching part calculates the gradient value to stretch the second brightness in the second portion including the brightness value that is larger than the second reference value in the received video signal, and outputs the received video signal having the decreased brightness in the fourth portion including the brightness value that is larger than the maximum brightness value in the video signal by applying the calculated gradient value to the fourth portion, to display the brightness of the received video signal corresponding to the fourth portion.

4. The video processing apparatus according to claim 3, further comprising an input part which receives a desired brightness value which is input,
wherein the brightness adjusting part adjusts the brightness of the whole portion of the received video signal depending on the desired brightness value received by the input part.

5. The video processing apparatus according to claim 4, further comprising a storing part which stores the brightness adjusting value and the gradient values,
wherein the brightness adjusting part adjusts the brightness depending on the stored brightness adjusting value, and
the brightness stretching part outputs the video signal having the adjusted brightness in the third portion including the brightness value that is smaller than the minimum brightness value and in the fourth portion including the brightness value that is larger than the maximum brightness value in the received video signal by applying the gradient value stored in the storing part to the third portion and the fourth portion, respectively, to display the brightness of the received video signal corresponding to the third portion and the fourth portion.

6. The video processing apparatus according to claim 2, further comprising an input part which receives a desired brightness value which is input,
wherein the brightness adjusting part adjusts the brightness of the whole portion of the received video signal depending on the desired brightness value received by the input part.

7. The video processing apparatus according to claim 6, further comprising a storing part which stores the brightness adjusting value and the gradient values,
wherein the brightness adjusting part adjusts the brightness depending on the stored brightness adjusting value, and
the brightness stretching part outputs the video signal having the adjusted brightness in the third portion including the brightness value that is smaller than the minimum brightness value and in the fourth portion including the brightness value that is larger than the maximum brightness value in the received video signal by applying the gradient value stored in the storing part to the third portion and the fourth portion, respectively, to display the brightness of the received video signal corresponding to the third portion and the fourth portion.

8. A video processing apparatus comprising:
a video processing part which outputs and displays a received video signal; and
a controller which checks whether gradient values calculated to stretch a first brightness in a first portion including a brightness value that is smaller than a first reference value and a second brightness in a second portion including a brightness value that is larger than a second reference value in the received video signal, and a brightness adjusting value to adjust the brightness of a whole portion of the received video signal are preset, and controls the video processing part to adjust the brightness of the received video signal depending on the brightness adjusting value if the gradient value and the brightness adjusting value are preset, and controls the video processing part to output the received video signal having the brightness adjusted by the brightness adjusting part in a third portion including a brightness value that is smaller than a minimum brightness value and in a fourth portion including a brightness value that is larger than a maximum brightness value in the received video signal by applying the calculated gradient values to the third portion and the fourth portion, respectively, to display the brightness of the received video signal corresponding to the third portion and the fourth portion.

9. The video processing apparatus according to claim 8, wherein if the brightness of the whole portion of the received video signal is increased by the brightness adjusting value, the controller calculates the gradient value to stretch the first brightness in the first portion including the brightness value that is smaller than the first reference value in the received video signal, and outputs the received video signal having the increased brightness in the third portion including the brightness value that is smaller than the minimum brightness value in the video signal by applying the calculated gradient value to the third portion, to display the brightness of the received video signal corresponding to third portion.

10. The video processing apparatus according to claim 8, wherein if the brightness of the whole portion of the received video signal is decreased by the brightness adjusting value, the controller calculates the gradient value to stretch the second brightness in the second portion including the brightness value that is larger than the second reference value in the received video signal, and outputs the received video signal having the decreased brightness in the fourth portion including the brightness value that is larger than the maximum brightness value in the video signal by applying the calculated gradient value to the fourth portion, to display the brightness of the received video signal corresponding to the fourth portion.

11. The video processing apparatus according to 10, further comprising an input part which receives a desired brightness value that is input,
wherein the controller adjusts the brightness of the whole portion of the received video signal depending on the desired brightness value received by the input part.

12. The video processing apparatus according to claim 11, further comprising a storing part which stores the brightness adjusting value and the gradient values,
wherein the controller controls the video processing part to output the video signal having the adjusted brightness in the third portion including the brightness value that is smaller than the minimum brightness value and in the fourth portion the brightness value that is larger than the maximum brightness value in the received video signal by applying the gradient value stored in the storing part to the third portion and the fourth portion, respectively, to display the brightness of the received video signal corresponding to the third portion and the fourth portion.

13. The video processing apparatus according to claim 12, further comprising an On-Screen Display (OSD) processing part which processes OSD data corresponding to the brightness adjusting value,
wherein the controller controls the OSD processing part and the video processing part to display a user input menu as an OSD to input the brightness adjusting value.

14. A video processing method comprising:
receiving a video signal;
calculating gradient values to stretch a first brightness in a first portion including a brightness value that is smaller than a first reference value and a second brightness in a second portion including a brightness value that is larger than a second reference value in the received video signal;
adjusting the brightness of a whole portion of the received video signal depending on a brightness adjusting value; and
outputting the received video signal having the adjusted brightness in a third portion including a brightness value that is smaller than a minimum brightness value and in a fourth portion including a brightness value that is larger than a maximum brightness value in the received video signal by applying the gradient values to the third portion and the fourth portion, respectively, to display the brightness of the received video signal corresponding to third portion and the fourth portion.

15. The video processing method according to claim 14, wherein if the brightness of a whole portion of a received video signal is increased depending on a brightness adjusting value, the outputting the received video signal having the adjusted brightness comprising calculating the gradient value to stretch the first brightness in the first portion including the brightness value that is smaller than the first reference value in the received video signal, and outputting the received video signal having the increased brightness in the third portion including the brightness value that is smaller than a minimum brightness value in the video signal by applying the calculated gradient value to the third portion, to display the brightness of the received video signal corresponding to third portion.

16. The video processing method according to claim 14, wherein if the brightness of a whole portion of a received video signal is decreased depending on a brightness adjusting value, the outputting the received video signal having the adjusted brightness comprising calculating the gradient value to stretch the second brightness in the second portion including the brightness value that is larger than the second reference value in the received video signal, and outputting the received video signal having the decreased brightness in the fourth portion including the brightness value that is larger than the maximum brightness value in the video signal by applying the calculated gradient value to the fourth portion, to display the brightness of the received video signal corresponding to the fourth portion.

17. The video processing method according to claim 16, wherein the adjusting the brightness of a whole portion of the received video signal further comprises receiving a desired brightness value, and
adjusting the brightness of the whole portion of the received video signal depending on the desired brightness value.

* * * * *